United States Patent
Kuang et al.

(10) Patent No.: US 7,273,439 B2
(45) Date of Patent: Sep. 25, 2007

(54) STRATEGY FOR MAPPING MOTOR SPEED TO CALCULATE DRIVER POWER DEMAND IN A HYBRID ELECTRIC VEHICLE

(75) Inventors: Ming Kuang, Canton, MI (US); Fazal Syed, Canton, MI (US); Paul Niessen, Plymouth, MI (US); Jonathan Butcher, Dearborn, MI (US); Deepa Ramaswamy, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 11/161,234

(22) Filed: Jul. 27, 2005

(65) Prior Publication Data

US 2006/0025258 A1    Feb. 2, 2006

Related U.S. Application Data

(60) Provisional application No. 60/598,127, filed on Jul. 31, 2004.

(51) Int. Cl.
*B60W 10/04* (2006.01)
(52) U.S. Cl. .......................... 477/3; 477/111; 903/941
(58) Field of Classification Search ................ None
See application file for complete search history.

(56) References Cited

U.S. PATENT DOCUMENTS

| | | | |
|---|---|---|---|
| 5,376,869 A | 12/1994 | Konrad | |
| 5,791,426 A | 8/1998 | Yamada et al. | |
| 6,018,198 A | 1/2000 | Tsuzuki et al. | |
| 6,054,844 A | 4/2000 | Frank | |
| 6,087,734 A | 7/2000 | Maeda et al. | |
| 6,208,034 B1 | 3/2001 | Yamaguchi | |
| 6,356,817 B1* | 3/2002 | Abe | 701/22 |
| 6,480,767 B2 | 11/2002 | Yamaguchi et al. | |
| 6,556,826 B1 | 4/2003 | Johnson et al. | |
| 6,603,278 B2 | 8/2003 | Oshima et al. | |
| 2001/0017470 A1 | 8/2001 | Takaoka et al. | |
| 2002/0062183 A1 | 5/2002 | Yamaguchi et al. | |
| 2002/0063540 A1 | 5/2002 | Oshima et al. | |
| 2003/0006076 A1 | 1/2003 | Tamor | |
| 2004/0168840 A1 | 9/2004 | Kuang et al. | |
| 2005/0016781 A1* | 1/2005 | Muta | 180/65.2 |
| 2006/0022469 A1* | 2/2006 | Syed et al. | 290/40 C |
| 2006/0025906 A1* | 2/2006 | Syed et al. | 701/22 |

* cited by examiner

*Primary Examiner*—Sherry Estremsky
(74) *Attorney, Agent, or Firm*—David B. Kelley; Brooks Kushman P.C.

(57) ABSTRACT

A controller and a control method is disclosed for determining a power demand for an engine in a hybrid electric vehicle powertrain. In computing engine power demand, a modified motor speed is used at zero and near-zero actual motor speeds to satisfy a driver demand for vehicle traction wheel torque.

11 Claims, 4 Drawing Sheets

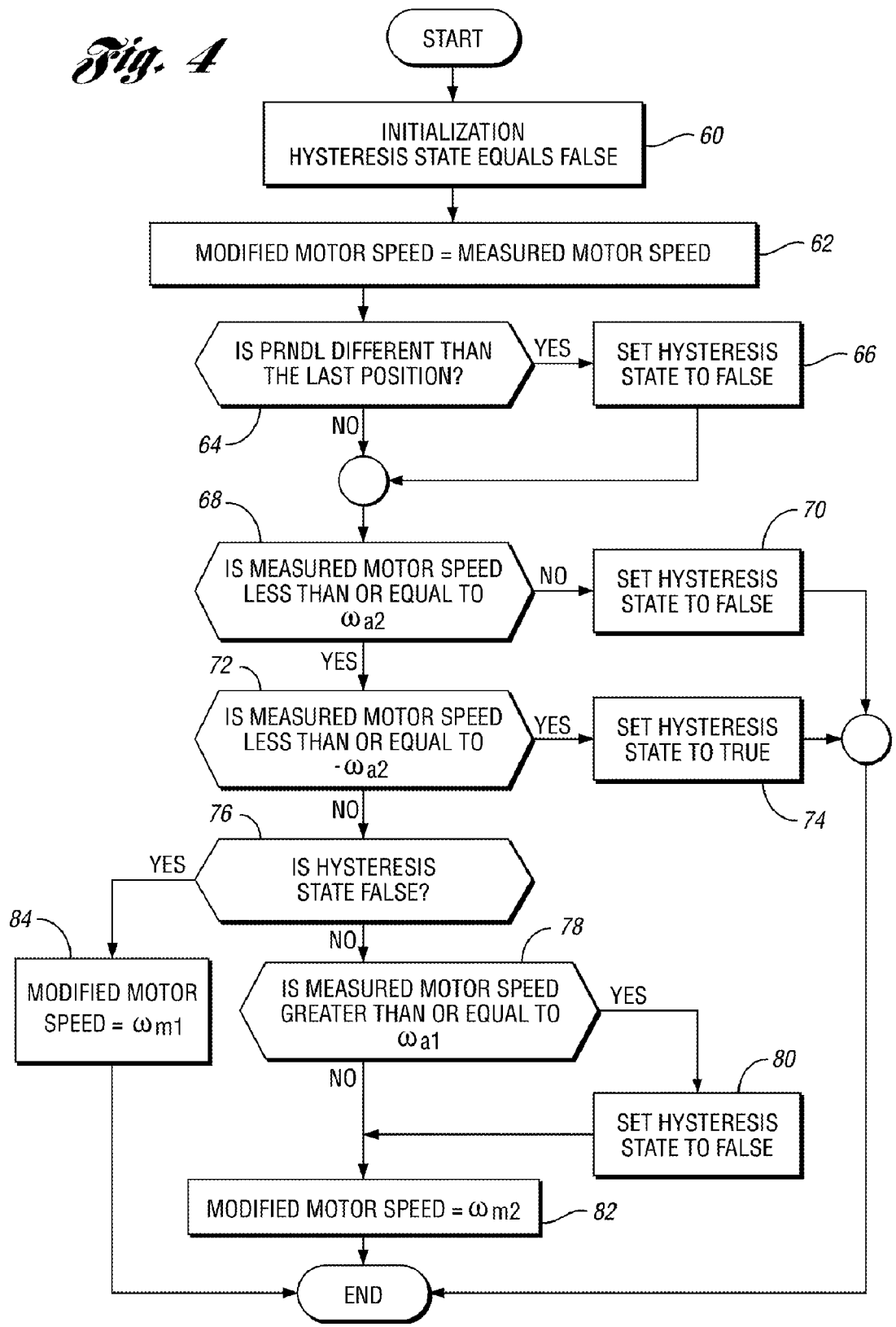

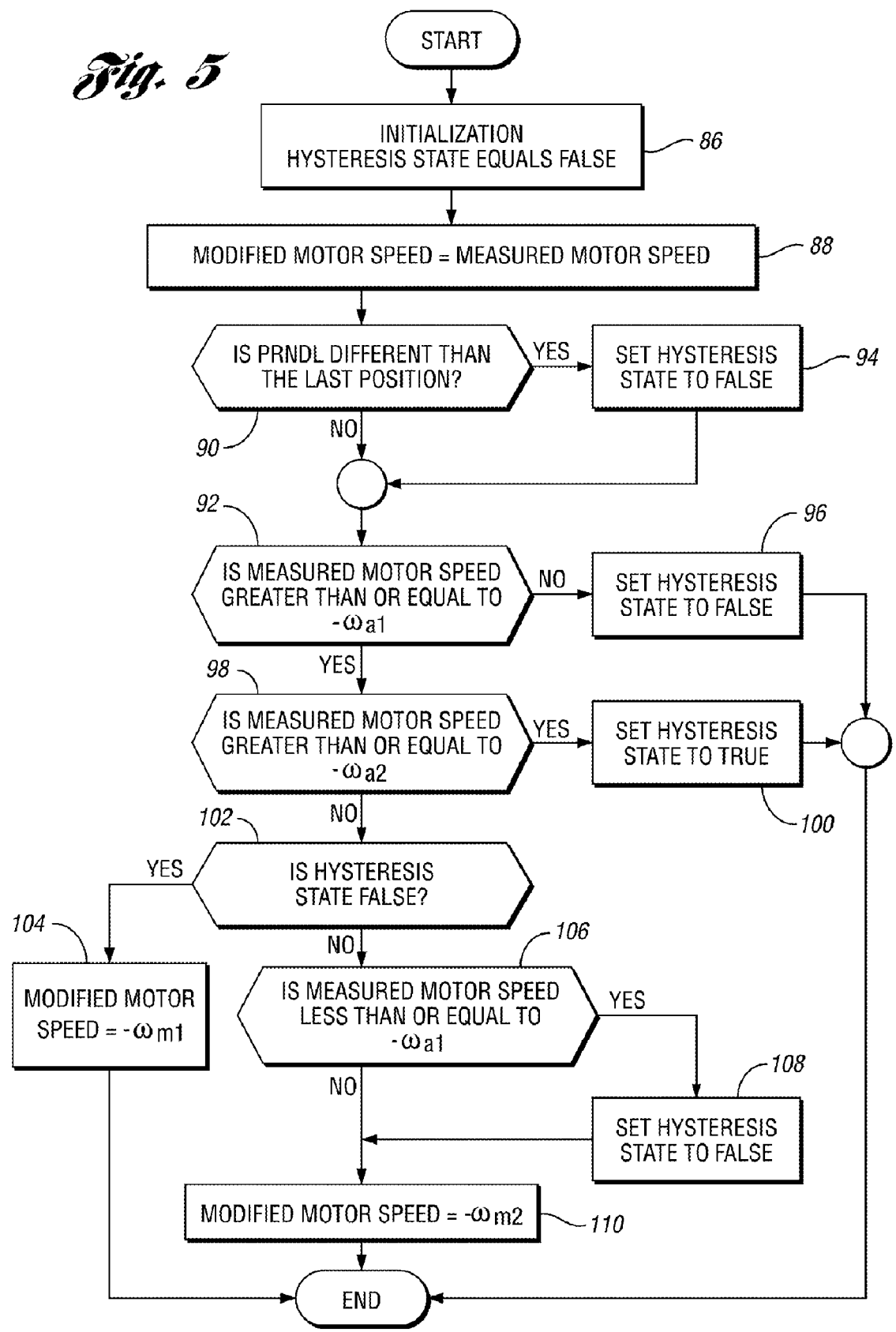

STRATEGY FOR MAPPING MOTOR SPEED TO CALCULATE DRIVER POWER DEMAND IN A HYBRID ELECTRIC VEHICLE

CROSS-REFERENCE TO RELATED APPLICATIONS

This application claims the benefit of U.S. provisional application Ser. No. 60/598,127 filed Jul. 31, 2004.

BACKGROUND OF THE INVENTION

1. Field of the Invention

The invention relates to the control of a hybrid electric vehicle using a modified engine power demand at zero and near-zero vehicle speeds.

2. Background Discussion

A parallel hybrid electric vehicle powertrain uses two sources of power. A first source is an internal combustion engine, and a second is an electric motor, a generator and a battery. A parallel hybrid electric vehicle design of this type is disclosed, for example, in co-pending U.S. patent application Ser. No. 10/248,886, filed Feb. 27, 2003, which is owned by the assignee of the present invention.

In the powertrain configuration of the co-pending patent application, a combination of an engine and generator uses a planetary gearset to establish a mechanical torque flow path and a separate electromechanical torque flow path to vehicle traction wheels. The battery is an energy storing device for the generator and the motor.

Engine power is divided into two power flow paths by controlling the generator speed. A mechanical path from the engine to the planetary gearset carrier ($T_e \omega_e$), to the planetary gearset ring gear, to a countershaft gearing output ($T_s \omega_s$) is established in addition to an electro-mechanical mechanical power flow path ($T_g \omega_g$ to $T_m \omega_m$), which extends from the engine to the generator to the motor and to the countershaft gearing. Engine power is divided and is controlled by the generator speed, which implies that the generator speed can be decoupled from the vehicle speed. This mode of operation is called is a "positive split."

Because of the mechanical properties of the planetary gearset, the generator can input power to the planetary gearset to drive the vehicle. This mode of operation is called "negative split." This combination of a generator, a motor and a planetary gearset thus can be considered to be an electromechanical transmission with CVT (continuously variable transmission) characteristics.

A generator brake can be activated so that engine output power then is transmitted with a fixed gear ratio to the torque output side of the powertrain through the mechanical power flow path only. This first power source can only effect forward propulsion of the vehicle since there is no reverse gear. The engine requires either generator control or application of the generator brake to transmit output power to the powertrain output for forward drive.

When the second power source is activated, the electric motor draws power from the battery and effects vehicle propulsion independently of the engine for both forward drive and reverse drive. In addition, the generator can draw power from the battery and drive against a one-way clutch on the engine power output shaft to propel the vehicle forward. The generator can propel the vehicle independently of the engine when that is necessary. This mode of operation is called "generator drive mode."

In order to integrate the two power sources to work together seamlessly to meet the driver's torque demand without exceeding the powertrain system limits, including battery limits, while optimizing total powertrain system efficiency and performance, coordinated control of the two power sources must be achieved. The powertrain of the co-pending patent application has a hierarchical vehicle system controller (VSC) that performs this coordinated control. Under normal powertrain operating conditions the VSC interprets the driver's demands (e.g., PRNDL selection and acceleration or deceleration demand) and then determines when and how much torque each power source needs to provide to meet the driver's demands and to achieve specified vehicle performance with respect to fuel economy, emissions, drivability, etc. The VSC controller determines the operating point on the characteristic torque-speed curve for the engine.

The coordinated control provided by the VSC for the two power sources is needed to meet driver demand, without exceeding the system power limits, to optimize the total system efficiency and performance. In addition power control is needed because the two power sources (i.e. engine and battery) in the powertrain system cannot both be expressed in terms of torque. In order to control power, therefore, it is necessary to convert driver torque demand to a power demand. The power demand will dictate how the powertrain system is being operated (e.g., how much power the engine should produce).

Difficulty in converting the driver's torque demand to a power demand arises when the vehicle speed or the motor speed is zero or near zero. The vehicle speed is proportional to motor speed. A power demand during a full accelerator pedal launch from a standing start effectively would be zero at the beginning of the launch, notwithstanding the fact that the driver is demanding full torque, if the motor speed were not properly mapped and made available to the controller to compute needed engine power. In addition, if the motor speed were mapped to a value that is too high (other than zero), that would result in a power demand that is too high, which would make the engine produce excess power. This excess power could exceed the battery charge limit, which may cause the vehicle to shut down.

When the vehicle is rolling backward and the driver is demanding a full accelerator pedal launch in a forward direction, improper motor speed mapping may result in a negative power demand even after the vehicle overcomes the rolling backward condition and moves in a forward direction. This negative power demand could adversely affect any engine power command by the controller. Without the engine outputting power, the vehicle acceleration performance could tend to be degraded.

SUMMARY OF THE INVENTION

The invention is a controller and a method and strategy for mapping motor speed properly and using a modified mapped motor speed in execution of a control algorithm to determine power demand so that an original driver torque demand is preserved when the actual motor speed is zero or near zero. Further, the method and strategy ensures that the engine will not produce excess power that may cause the vehicle to shut down. Still further, the method and strategy ensures that the driver will be provided with maximum powertrain system power and performance, if it is required, in rollback situations.

The method and strategy of the invention makes it possible to optimize total system efficiency and performance without exceeding system power limits, including battery charging and discharging limits. A modified non-zero motor speed is used by the strategy, thereby avoiding the possibility of producing excess engine power when motor speed is less than a threshold value. This protects the battery from overcharging.

The method and strategy is characterized by a hysteresis feature when motor speed is within a speed zone close to zero motor speed. Substitution of a modified non-zero motor speed of small magnitude for actual motor speed at that time to replace a very small or zero actual motor speed in determining power command by the controller will avoid discontinuities in torque delivered to the transmission output shaft as the actual motor speed approaches zero or changes sign (i.e., from plus to minus or from minus to plus).

BRIEF DESCRIPTION OF THE DRAWINGS

FIG. 4 is a flow chart showing a strategy algorithm for motor speed mapping with the vehicle conditioned for forward drive;

FIG. 5 is a flow chart illustrating the strategy for motor speed mapping with the vehicle conditioned for reverse drive.

DETAILED DESCRIPTION OF AN EMBODIMENT OF THE INVENTION

Figure 1:
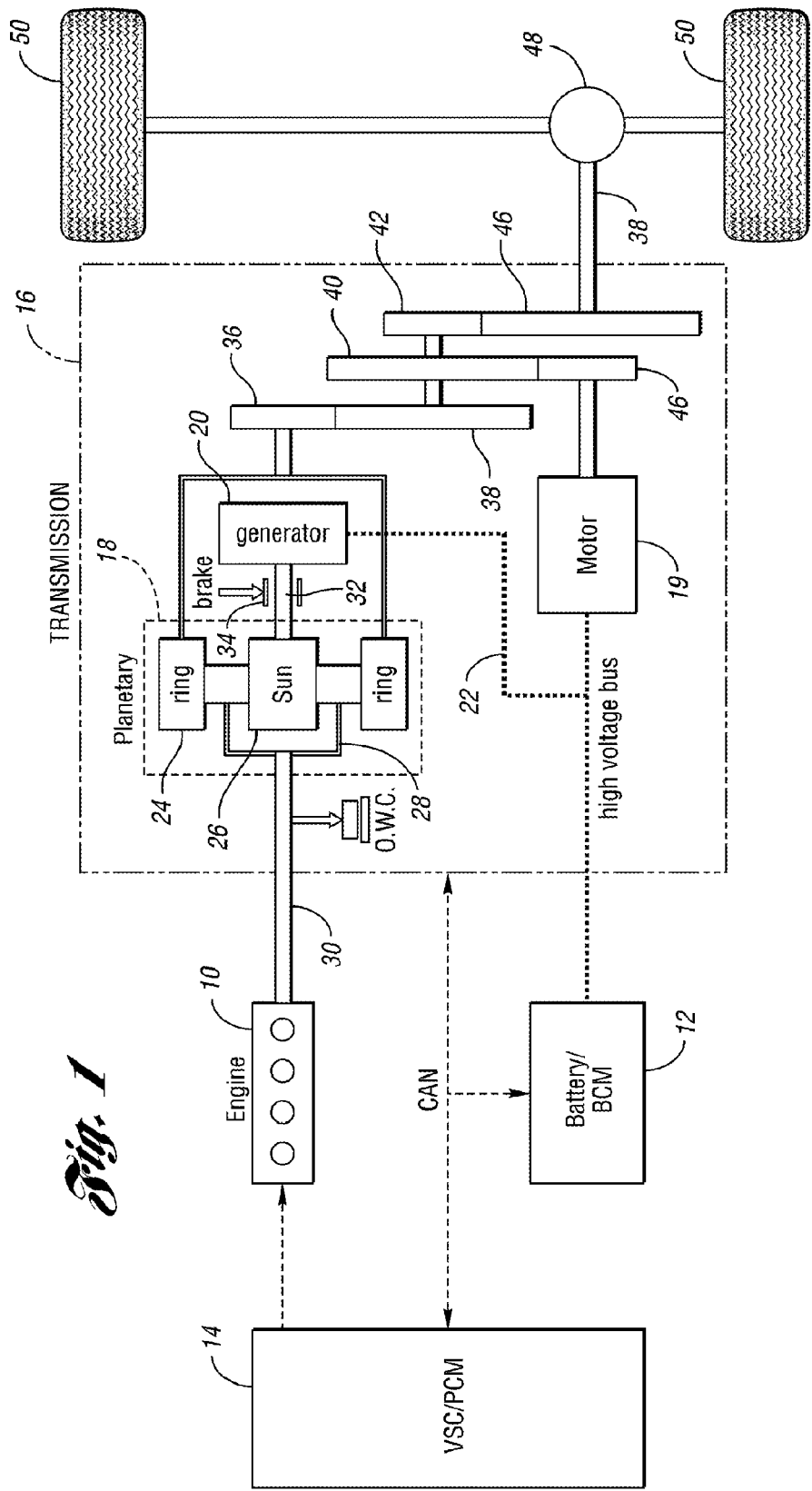
FIG. 1 is a schematic illustration of a divided power flow powertrain system configuration.

FIG. 1 shows a hybrid electric vehicle powertrain comprising an engine 10, which may be an internal combustion engine, a battery and battery control module 12, and a vehicle system controller and powertrain control module 14.

A power transmission 16 of the powertrain comprises a planetary gearset 18, an electric generator 20 and an electric motor 19. Typically the motor is a high voltage induction motor. The battery 12, the motor 19 and the generator 20 are electrically coupled through a high voltage bus 22.

The planetary gearset 18 comprises ring gear 24, sun gear 26 and planetary carrier 28. The engine power output shaft 30 is connected drivably to the carrier 28. Generator 20 is mechanically coupled to sun 26 gear by generator shaft 32.

A selectively operable mechanical brake 34 can be applied to establish a fully mechanical power flow path from engine 10 to ring gear 24. The ring gear 24 is mechanically connected to countershaft gear element 36, which drives countershaft gear element 38. Companion countershaft gear elements 40 and 42 are drivably connected, respectively, to motor output gear 44 and transmission output drive gear 46.

The motor is capable of establishing an electro-mechanical torque flow path to gear 46, which in turn drives a differential axle assembly 48 for delivering power to traction wheels 50.

When the brake 34 is released, sun gear 26 drives generator 20 by providing reaction torque on the sun gear 26, which creates a divided power flow path through the planetary gearset, including a mechanical power flow path from the carrier 28 to the ring gear 24 and finally to the gear 36. The electromechanical power flow is established as the sun gear 26 drives generator 20. The motor, being electrically coupled to the generator, then powers gear 44.

Figure 2:
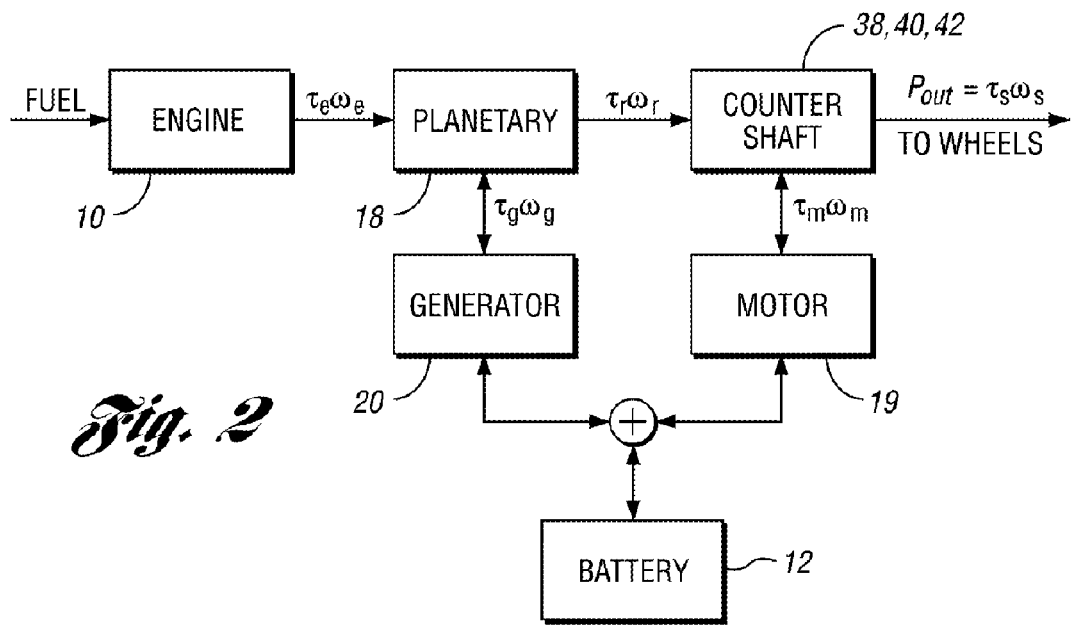
FIG. 2 is a powertrain system power flow diagram.

FIG. 2 is a schematic representation of the power flow between the elements illustrated schematically in FIG. 1. Power from the engine is indicated in FIG. 2 as a product of engine torque and engine speed $T_e \omega_e$. Power flow from the planetary gearset is indicated to be the product of ring gear torque $T_r$ and ring gear speed $\omega_r$.

Power flow between the planetary gear set and the generator can be in either direction, as indicated by the dual directional arrow. This occurs when the brake 34 is released. The generator power is indicated to be the product of generator torque $T_g$ and generator speed $\omega_g$.

Power delivered to the countershaft is delivered to the wheels. It is indicated to be the product of countershaft torque $T_s$ and countershaft speed $\omega_s$.

Power flow between the countershaft gearing and the motor, which also is dual directional, is indicated in FIG. 2 to be the product of motor torque $T_m$ and motor speed $\omega_m$.

Because the battery can either be in a charging state or discharging state, the arrow indicating power flow for the battery 12 is a dual directional arrow.

Figure 3:
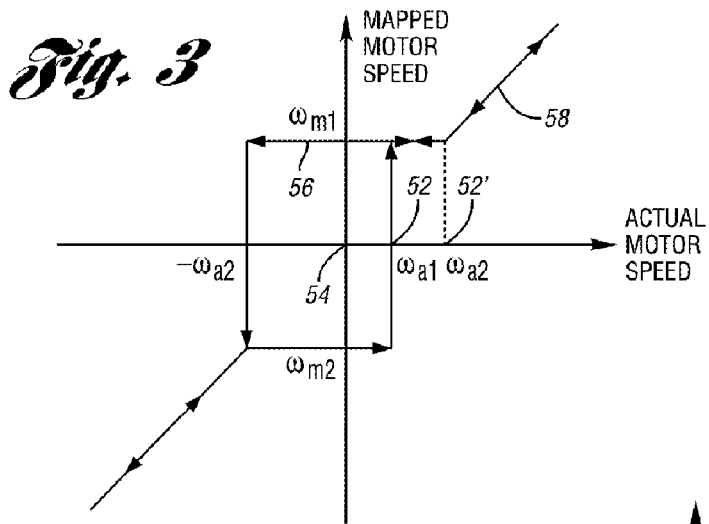
FIG. 3 is a motor speed mapping diagram.

The motor speed mapping diagram of FIG. 3 has speed vectors for the forward drive range of the transmission. The method of the invention deals with the limiting case of motor speed being zero. The strategy of the method results in the use of an artificial non-zero, small motor speed while performing a conversion between speed and torque. Further, the strategy provides hysteresis and avoids discontinuities while operating at or below these non-zero motor speeds.

A small artificial motor speed is shown at 56 in FIG. 3. The actual zero motor speed point is the intersection of the Cartesian coordinates of FIG. 3, as shown at 54. If the vehicle is rolling forward and the actual motor speed is less than $\omega_{a2}$ at 52', the motor speed is set to a constant $\omega_{m1}$, as shown at 56, to ensure a proper non-zero driver power demand. When the actual motor speed is greater than $\omega_{a1}$, the mapped motor speed is set equal to actual motor speed, as shown at 58.

If the vehicle is rolling backward so that motor speed is slower than $-\omega_{a2}$, the mapped motor speed remains at $\omega_{m1}$. As soon as the vehicle rolls backward so that motor speed is faster than $-\omega_{a2}$, the mapped motor speed again is set equal to actual motor speed so that the proper driver power demand can be calculated to prevent the battery from overcharging. Eventually, the vehicle will recover from rolling backward, which means that the vehicle is being stopped and begins to move forward. During this period, if the vehicle rolls backward and the motor speed is slower than $-\omega_{a2}$ or moves forward slower than $\omega_{a1}$, the mapped motor speed is set to be a constant $\omega_{m1}$, to prevent the battery from being overcharged.

When the actual motor speed during a forward launch is greater than $\omega_{a1}$, but less than $\omega_{a2}$, the mapped motor speed is set at $\omega_{m1}$. When the actuator motor speed exceeds $\omega_{a2}$, the mapped motor speed again is shown at 58.

As soon as the actual motor speed is greater than $\omega_{a2}$ during a forward launch, the mapped motor speed is set equal to the actual motor speed, as previously explained, so that a proper power demand is calculated. The engine then will be commanded properly to achieve the acceleration performance that is desired.

$\omega_{a1}$, $\omega_{a2}$, $\omega_{m1}$, $\omega_{m2}$, $-\omega_{a2}$ and $-\omega_{a1}$ are calibratible constants. $\omega_{a1}$ and $-\omega_{a1}$ are calibrated to be small values such that the engine will be commanded to deliver power to achieve acceleration performance as soon as the vehicle is stopped and begins to move forward or as soon as the vehicle stops rolling backward and begins to roll forward. This same concept can be applied to motor speed mapping with the vehicle in reverse drive mode, which will be explained with reference to FIG. 3a.

Figure 3A:
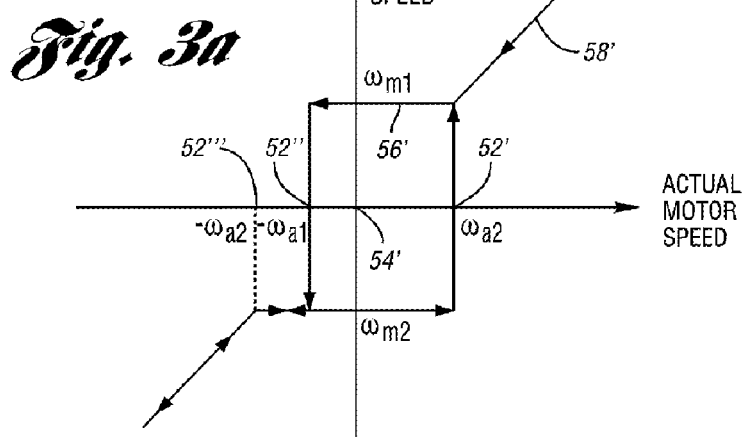

FIG. 3a generally corresponds to the forward gear drawing mapping diagram of FIG. 3 for a vehicle in the forward drive or low gear ranges. The actual zero motor speed is shown at 54'. If the reverse drive motor speed is greater than $\omega_{a2}$, as shown at 52', the mapped motor speed is equal to the actual motor speed, as shown at 58'. If the actual motor speed is less than $\omega_{a2}$ and greater than $-\omega_{a1}$ an artificial mapped motor speed $\omega_{m2}$ is used in determining engine power demand. If the actual reverse motor speed is greater than $-\omega_{a1}$ as shown at 52", the mapped motor speed is $\omega_{m2}$. If the actual motor speed is greater than $-\omega_{a1}$ but less than $-\omega_{a2}$, the mapped motor speed value of $\omega_{m2}$ is retained. If the actual motor speed is greater than $-\omega_{a2}$, as shown at 52''', the mapped motor speed again is equal to the actual motor speed.

FIG. 4 shows a flowchart of a speed mapping strategy when the powertrain is in a park mode, a neutral mode, a forward drive range mode or a low ratio drive mode in a forward driving direction. At the start of the control routine for the vehicle system controller and the powertrain control module 14, an initialization step is carried out as shown at 60. At that time, it is determined whether the controller is in a hysteresis state.

For purposes of the description of FIGS. 4 and 5, the term hysteresis state means the operating condition in which the actual motor speed is less than $\omega_{a2}$ and greater than $-\omega_{a2}$ and wherein the mapped motor speed is less than $\omega_{m1}$ and greater than $-\omega_{m2}$. This operating condition is indicated in the mapped motor speed chart of FIG. 3 for forward operation. In the case of reverse gear drive, the term hysteresis state, which likewise will be used in the following discussion of FIG. 5, likewise refers to operation in the operating zone surrounding the zero point 54' for the mapped motor speed, as shown in FIG. 3*a*.

The initialization step for the routine of FIG. 4 is indicated at 60. If it is determined that the hysteresis state is not in place, the modified motor speed will equal the measured motor speed, as shown at step 62. This condition is plotted at 58 in FIG. 3.

The routine then determines at decision block 64 whether the driver control range selection has been changed from the position that was in place during the preceding background control loop. If the decision at 64 is positive, the hysteresis state is set to false, as shown at 66. If the driver controlled selection at 64 is different than that which existed in the preceding control loop, the routine will advance to decision block 68 provided the hysteresis state determined at 66 is false. It is determined, at decision block 68, whether the measured motor speed is less than or equal to $\omega_{a2}$, as shown at 52' in FIG. 3. If it is not less than that value, the hysteresis state is set to false again at action block 70. If the measured motor speed is indeed less than $\omega_{a2}$, the routine proceeds to decision block 72 where it is determined whether the measured motor speed is less than or equal to $-\omega_{a2}$. If it is less than or equal to $-\omega_{a2}$, the hysteresis state is set to true at action block 74. If the decision at block 72 is negative, the hysteresis state is set to false, as shown at 76 in FIG. 4.

If the measured motor speed is greater than or equal to the switch point $\omega_{a1}$, as shown at decision block 78, the hysteresis state is set to false as shown at 80 in FIG. 4. If the measured motor speed is not greater than or equal to the switch point speed $\omega_{a1}$, the routine will use a modified motor speed $\omega_{m2}$, as shown at 82.

The steps shown at 78, 80 and 82 occur if the hysteresis state is indicated to be false at step 76. If the hysteresis state is indicated to be positive at step 76, the modified motor speed $\omega_{m1}$ is used in the determination of power demand. This is indicated at 84 in FIG. 4.

The motor speed mapping technique described with reference to FIG. 4 is similar to the control routine illustrated in the flowchart of FIG. 5 for reverse drive. As in the case of forward drive, the controller is initialized at the start of the routine at shown at 86. If the hysteresis state, determined at 86, is false, the modified motor speed is equal to the measured motor speed, as shown at 58' in FIG. 3. This step is shown at 88 in FIG. 5.

If it is determined, at decision block 90, as the control loop continues, whether the driver has changed the drive range selection from the selection that existed in the preceding control loop. If no change exists, the routine will proceed to decision block 92. If a change has occurred, a test is made at 94 as to whether the hysteresis state still is false. If the decision at block 90 is negative and the hysteresis state is false, the measured motor speed at block 92 is tested to determine whether it is greater than or equal to $\omega_{a1}$ as shown at 52" in FIG. 3*a*. If the decision at block 92 is negative, the hysteresis state is set to false at 96 and the routine does not proceed further. If the decision at 92 is positive, it is determined at decision block 98 whether the motor speed is greater than or equal to $-\omega_{a2}$, as shown at 52''' in FIG. 3*a*. If the decision at block 98 is positive, the hysteresis state is set to true, as shown at 100 in FIG. 5.

If the decision at block 98 is negative, it is verified at decision block 102 whether the hysteresis state is false. If it is false, a modified motor speed is set equal to $-\omega_{m1}$, as shown at action block 104.

If it is determined at decision block 102 that the hysteresis state is not false, the routine proceeds to decision block 106 where it is determined whether the measured motor speed is less than or equal to the switch point value of $-\omega_{a1}$. If that decision is positive, the hysteresis state is set to false at 108. Otherwise, the routine proceeds to action block 110 where the modified motor speed is set to $-\omega_{m2}$.

Although an embodiment of the invention has been disclosed, it will be apparent to a person skilled in the art that modifications to the invention may be made without departing from the scope of the invention and equivalents thereof.

What is claimed is:

1. A hybrid electric vehicle powertrain including an engine, a motor/generator and battery sub-system and a controller;

the engine defining in part a mechanical power flow path to a driveshaft for a traction wheel-and-axle assembly;

the sub-system defining in part an electro-mechanical power flow path to the traction wheel-and-axle assembly driveshaft whereby engine power is complemented by electrical power;

the sub-system having an electric motor drivably connected to the driveshaft;

the controller responding to a drive torque demand by determining engine power required to satisfy the driver demand for driver torque;

the engine power determined by the controller being a function of actual motor speed and torque at motor speeds greater than a predetermined value; and the engine power determined by the controller being a function of a calibrated motor speed of non-zero value at actual motor speeds less than the predetermined value.

2. The powertrain set forth in claim 1 wherein the calibrated motor speed and the actual motor speed are substantially equal at actual motor speeds greater than the predetermined actual motor speed value and wherein the calibrated motor speed remains substantially unchanged when the motor speed and the calibrated motor speed are in a hysteresis speed state.

3. The powertrain set forth in claim 2 wherein the actual motor speed has a positive value during forward vehicle motion and the calibrated motor speed has a greater positive value than actual motor speed in the hysteresis state.

4. The powertrain set forth in claim 2 wherein the actual motor speed has a negative value during reverse vehicle motion and the calibrated motor speed has a greater negative value than actual motor speed in the hysteresis speed state.

5. The powertrain set forth in claim 3 wherein the calibrated motor speed remains at a positive and substantially unchanging value when the actual motor speed is negative and is in the hysteresis state as the vehicle motion is in a reverse direction.

6. The powertrain set forth in claim 4 wherein the calibrated motor speed remains at a negative and substantially unchanging value when the actual motor speed has a positive value in the hysteresis speed state.

7. A method for coordinating power delivery from an engine and an electric motor in a hybrid electric vehicle powertrain to meet a driver's demand for vehicle driving torque, the vehicle having traction wheels drivably connected mechanically to the engine and to the motor whereby a mechanical power flow path and an electro-mechanical power flow path are established, the method comprising:
   setting predetermined power limits of the electromechanical power flow path;
   measuring actual motor speed; and
   using a calibrated motor speed of small non-zero value to coordinate power delivery from the engine and the electric motor when the actual motor speed is less than a predetermined value.

8. The method set forth in claim 7 including the step of:
   determining engine power as a function of traction wheel torque and actual motor speed in response to driver demand for traction wheel torque when actual motor speed exceeds the predetermined actual motor speed value.

9. The method set forth in claim 8 wherein the mapped motor speed value is a small non-zero positive value when the vehicle speed decreases toward a zero speed during forward vehicle motion and wherein the calibrated motor speed is a small non-zero negative speed value when the vehicle speed increases toward a zero speed during reverse vehicle motion.

10. The method set forth in claim 7 including the steps of:
   determining engine power as a function of traction wheel torque and actual motor speed in response to driver demand for traction wheel torque when actual motor speed exceeds the predetermined actual motor speed value; and
   determining engine power as a function of traction wheel torque and the calibrated motor speed when the powertrain is in a hysteresis state in which the actual motor speed is a small non-zero value less than the predetermined actual motor speed value whereby the predetermined power limits are not exceeded while meeting a driver torque demand.

11. The method set forth in claim 10, wherein the hysteresis state corresponds to an actual motor speed between a small non-zero positive speed value during forward motion of the vehicle and a small non-zero negative speed value during reverse motion of the vehicle.

* * * * *